(No Model.) 2 Sheets—Sheet 1.

W. S. MERKLE.
UNDERGROUND CONDUIT FOR ELECTRIC RAILWAYS.

No. 554,450. Patented Feb. 11, 1896.

Attest:
R. P. Rybitzki.
M. P. Smith.

Inventor:
W. S. Merkle.
By Higdon & Higdon & Longan.
Attys.

(No Model.) 2 Sheets—Sheet 2.
W. S. MERKLE.
UNDERGROUND CONDUIT FOR ELECTRIC RAILWAYS.
No. 554,450. Patented Feb. 11, 1896.
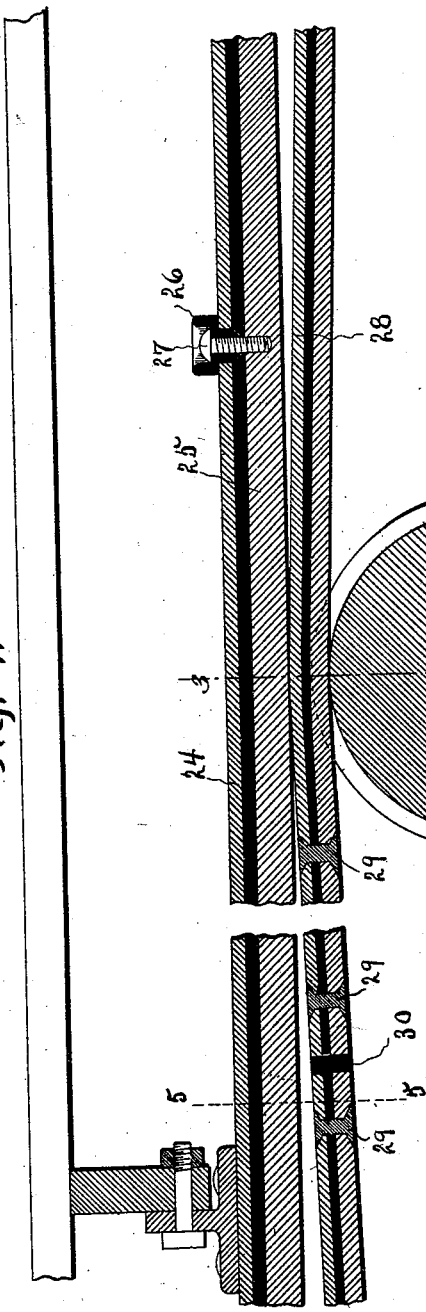
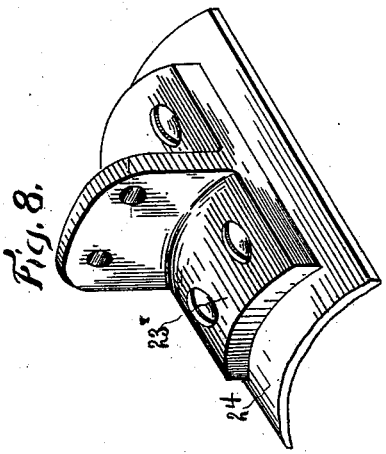
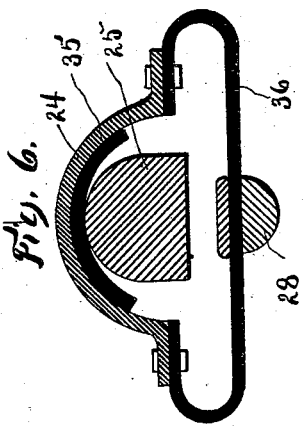
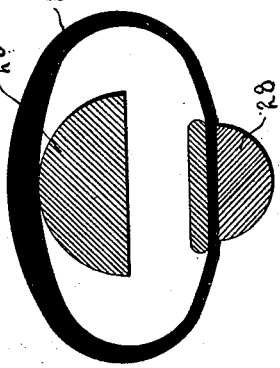
Attest:
A. P. RYBITZKI.
M. P. Smith.
Inventor;
W. S. Merkle.
By Higdon & Higdon & Longan.
Attys.

UNITED STATES PATENT OFFICE.

WILLIAM S. MERKLE, OF ST. LOUIS, MISSOURI.

UNDERGROUND CONDUIT FOR ELECTRIC RAILWAYS.

SPECIFICATION forming part of Letters Patent No. 554,450, dated February 11, 1896.

Application filed March 29, 1894. Serial No. 505,547. (No model.)

*To all whom it may concern:*

Be it known that I, WILLIAM S. MERKLE, of the city of St. Louis, State of Missouri, have invented certain new and useful Improvements in Underground Conduits for Electric Railways, of which the following is a full, clear, and exact description, reference being had to the accompanying drawings, forming a part hereof.

This invention relates to an underground system of electric railways, and has for its object the provision of safe, effective, economical and convenient means for conveying electric energy beneath the surface of the ground, and applying said energy to the propulsion of vehicles, carriages, &c., adapted to be advanced along the line.

This invention consists in the novel construction, combination and arrangement of parts, hereinafter described and claimed.

Figure 1:
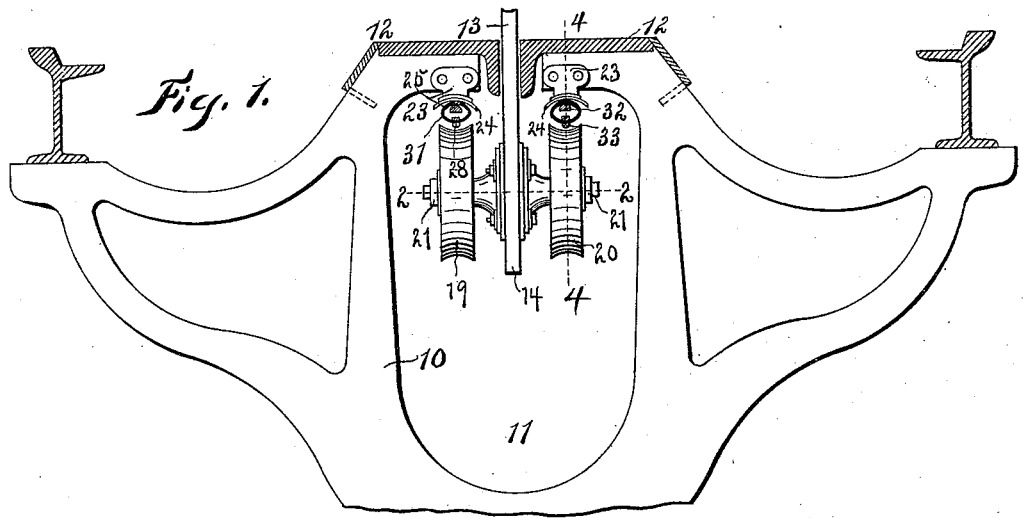
Figure 2:
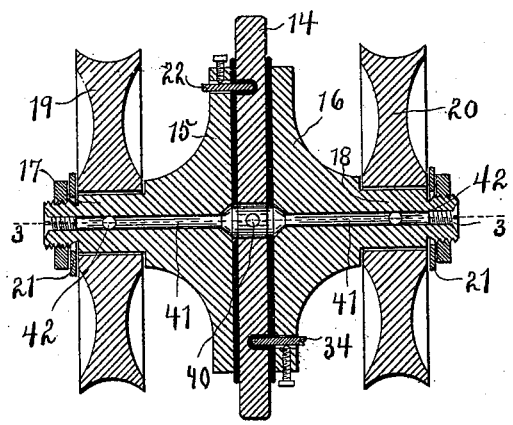
Figure 3:
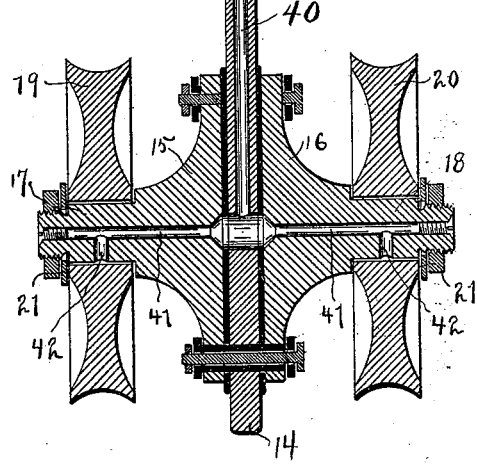
Figure 4:
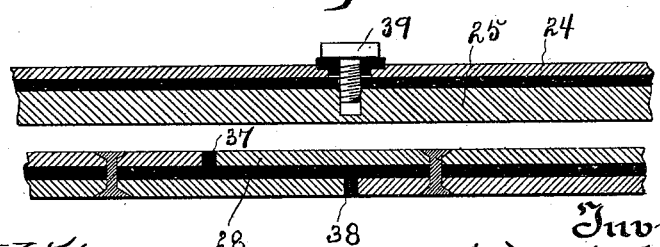

Referring to the drawings, Figure 1 is a transverse sectional elevation of a conduit, showing my device applied therein. Fig. 2 is a horizontal sectional view on the line 2 2 of Fig. 1. Fig. 3 is a vertical sectional elevation on the line 3 3 of Fig. 4. Fig. 4 is a longitudinal sectional elevation of the conduit on the line 4 4 of Fig. 1. Fig. 5 is a transverse sectional elevation on the line 5 5 of Fig. 4, the supporting-cap being removed. Fig. 6 is a transverse sectional elevation showing a modified form of conductor. Fig. 7 is a longitudinal sectional elevation of a modified form of conductor. Fig. 8 is a perspective view of a supporting-bracket and a portion of the cap.

In the construction of the device as shown, the numeral 10 designates the conduit-yokes, and 11 the conduit between the same, which conduit-yokes have secured thereto top plates 12 12, a slot being provided between the said plates 12 12, through which the trolley-pole 13 is adapted to pass.

Mounted on the lower end portion of the trolley-pole 13 is a plate 14, having its greatest transverse dimension in a vertical plane. Rigidly secured to the opposite sides of the plate 14 and insulated therefrom are hubs 15 16, on which hubs are formed spindles 17 18 carrying trolley-wheels 19 20 revolubly mounted thereon, and secured thereto by nuts and washers 21.

The trolley-wheel 19 is electrically connected with a conductor-wire 22, which said conductor-wire extends vertically within the trolley-pole 13 to a point of connection with the motor. (Not shown.)

Fixed to and depending from the yokes 10, on one side of the slot, are a plurality of brackets or hangers 23, Fig. 8, to the lower faces of which hangers are secured cap-plates 24, which said cap-plates extend from one end to the other of the conduit.

Fixed to the cap-plates 24 is a conducting line-wire 25, which said line-wire is insulated from the said cap-plates. The connections between the cap-plates and the line wire comprise a socket 26, made of rubber or other insulating material, and a screw 27, seated within said socket and in the line-wire, that portion of the socket above the head of the screw 27 being filled with paraffine-wax or other analogous non-conducting material.

Located below the line conductor and adapted to periodically contact therewith is a contact-conducting wire 28, which contact-conducting wire is longitudinally divided into two sections, insulated from each other and connected by means of rivets 29, which said rivets are electrical conductors.

The contact-wire 28 is transversely divided into sections, the lengths of which may vary, and are separated by insulating material, as indicated by 30 in Fig. 4.

The insulating material between the longitudinal sections of the contact-wire 28 is integrally formed with the insulating material interposed between the line-wire and the cap-plates 24, and, together with the same, forms a tube 31.

The insulating material just described is flexible and preferably made of soft rubber, adapted to yield under pressure to permit of the contact of the wire 28 with the line-wire 25.

Located on the opposite side of the slot, within the conduit 11, are a plurality of hangers, cap-plates fixed to said hangers, and a tube containing a return-wire 32 and contact-wire 33 of identically the same construction as has been described in connection with the feed-line wire.

The trolley-wheel 20 contacts with the wire 33 and is electrically connected with the motor by means of a conducting-wire 34, which said conducting-wire extends vertically through the trolley-pole to a point of attachment to the motor (not shown) and receives the exhaust or return current from said motor.

The conductor-wires 22 34 are insulated from the plate 14 and from the trolley-pole.

In the modification shown in Fig. 6 the cap-plate 24 is insulated by a narrow strip of material 35 from the line-wire 25, and has secured to its opposite edges the edge portions of the flexible insulator 36, preferably made of sheet-brass, which latter insulator carried the contact-wire 28, formed in sections as before described.

In the modification shown in Fig. 7 the contact-wire 28 has its longitudinal sections transversely divided at points 37 38 out of alignment with each other, and a modified means of connection between the cap-plate 24 and the line-wire 25 is shown, which comprises a lag-screw 39, which is insulated from the said cap-plate.

The trolley-pole 13 is provided with a longitudinal bore 40, which communicates at its lower end with a bore in the plate 14, which said latter bore communicates with transverse bores 41 in the hubs 15 16, and the spindles 17 18, ports of communication 42 being provided between the outer end portions of the bores 41 and the bearings of the trolley-wheels. The bores 40 41 are adapted to be filled with lubricating material, which is automatically fed upon the bearings of the trolley-wheels, and is supplied from the reservoir carried on the car and not shown in the drawings.

The operation of this device is as follows: When it is desired to propel the car, or, in other words, establish an electrical connection between the source of electric energy and the motor carried upon the car, the hubs 15 16 are elevated by lever mechanism of common construction, (not shown,) thus raising the trolley-wheels 19 20, which said trolley-wheels, by reason of their impingement against the contact-wires 28 33, lift said contact-wires until the upper sections thereof engage with the feed-line and return-conductor, respectively, by this means establishing a contact between said contact-wires and the feed-line and return-wires, respectively.

It will be observed by reference to Fig. 4 that only a small portion of the surface of the contact-wire 28 is in engagement with the line-wire 25 at a given time, but that the adjacent surface of the said wires are progressively contacted therewith during the advance of the trolley-wheels and synchronously with the advance of the trolley-wheels fall away from such contact and assume a normal position, limited only by the expansibility of the tube 31.

What I claim is—

In an underground electric system, the combination of a plurality of hangers 23, a conductor 25 semicircular in cross-section, the flat face of which forms a contact-surface, a cap-plate 24 semicircular in cross-section and provided with perforated side flanges and fixed to but insulated from said conductor, said hangers supporting said cap-plate, flexible insulating material 36 having its edges bolted to the said flanges of said cap-plate, and a flat contact-wire 28 extending parallel to the said conductor and supported by the said flexible insulating material, substantially as herein specified.

In testimony whereof I affix my signature in presence of two witnesses.

WILLIAM S. MERKLE.

Witnesses:
M. G. IRWIN,
JNO. C. HIGDON.